(12) United States Patent (10) Patent No.: US 8,213,878 B1
Robbins et al. (45) Date of Patent: Jul. 3, 2012

(54) RF SWITCH POWER SPLITTER FOR WLAN AND BLUETOOTH COEXISTENCE

(75) Inventors: Brian Robbins, Kernersville, NC (US); Cody Hale, Browns Summit, NC (US); Ryan Pratt, High Point, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 353 days.

(21) Appl. No.: 12/567,081

(22) Filed: Sep. 25, 2009

Related U.S. Application Data

(60) Provisional application No. 61/100,194, filed on Sep. 25, 2008.

(51) Int. Cl.
*H04B 1/44* (2006.01)

(52) U.S. Cl. ...... 455/78; 455/67.13; 455/41.2; 455/63.1; 455/114.2; 455/450; 455/509; 370/338; 370/329; 370/341; 375/219; 375/260

(58) Field of Classification Search .............. 455/78, 455/67.13, 41.2, 63.1, 114.2, 552.1, 509, 455/450; 370/338, 329, 341; 375/219, 260, 375/316
See application file for complete search history.

(56) References Cited

U.S. PATENT DOCUMENTS

| | | | | |
|---|---|---|---|---|
| 6,829,288 B2* | 12/2004 | Orava | ............................ | 375/132 |
| 7,146,133 B2* | 12/2006 | Bahl et al. | ..................... | 455/63.1 |
| 7,518,469 B2* | 4/2009 | Kemmochi et al. | ............. | 333/126 |
| 7,587,001 B2* | 9/2009 | Hazani et al. | ................... | 375/316 |
| 7,773,956 B2* | 8/2010 | Fukamachi et al. | ............ | 455/78 |
| 7,801,099 B2* | 9/2010 | Desai | ............................ | 370/338 |
| 7,813,451 B2* | 10/2010 | Binder et al. | ................... | 375/316 |
| 7,873,385 B2* | 1/2011 | Boireau et al. | ............... | 455/553.1 |
| 7,924,117 B2* | 4/2011 | Kemmochi et al. | ............. | 333/132 |
| 7,983,216 B2* | 7/2011 | Iyer et al. | ........................ | 370/329 |
| 2002/0071477 A1* | 6/2002 | Orava | ............................ | 375/132 |
| 2007/0060055 A1* | 3/2007 | Desai et al. | ................... | 455/41.2 |
| 2007/0120619 A1 | 5/2007 | Kearns | | |
| 2007/0223430 A1 | 9/2007 | Desai et al. | | |
| 2008/0139151 A1 | 6/2008 | Ojo et al. | | |
| 2010/0137025 A1* | 6/2010 | Tal et al. | ...................... | 455/553.1 |

* cited by examiner

*Primary Examiner* — Marceau Milord
(74) *Attorney, Agent, or Firm* — Withrow & Terranova, P.L.L.C.

(57) ABSTRACT

A RF switch may be used as a power splitter in order to allow WLAN and Bluetooth (BT) coexistence. Multiple branches of the RF switch are enabled concurrently, which allows WLAN and BT signals to be received simultaneously. The RF switch functions as a power splitter to split signals received from an antenna to both a WLAN receiver and a BT receiver. In one embodiment, a second switch may be placed on an output of a low noise amplifier (LNA). This configuration will operate as a power splitter between WLAN receiver port and a BT port, and maximize the receiver sensitivity by amplifying both the WLAN and BT signals. One or both of the two switches may also function to bypass the LNA when the LNA is not needed to provide a low loss RF path, which serves to broaden the dynamic range of the device and avoid signal distortion during periods of increased signal power.

20 Claims, 6 Drawing Sheets

RF SWITCH POWER SPLITTER FOR WLAN AND BLUETOOTH COEXISTENCE

This application claims the benefit of provisional patent application Ser. No. 61/100,194, filed Sep. 25, 2008, the disclosure of which is hereby incorporated herein by reference in its entirety.

FIELD OF THE DISCLOSURE

Embodiments described herein relate to communication devices and in particular to using radio frequency (RF) switches in communication devices as power splitters to allow different types of signals to be received and transmitted simultaneously by the communication device.

BACKGROUND OF THE TECHNOLOGY

The use of both Bluetooth (BT) and Wireless Local Area Networks (WLANs) has gained popularity in recent years. BT systems provide short distance wireless links for exchanging data over short distances (e.g., generally 10 meters or less, although some BT devices may operate within a larger range) to and from fixed and mobile devices, creating personal area networks (PANs). WLANs provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system. There are some instances and circumstances where it is desirable to operate both BT and WLAN systems for enhanced functionality. Certain communication devices, such as desktop or laptop computers, mobile phones, PDAs, or other handheld consumer devices, may be capable of receiving and/or sending both BT and WLAN signals.

However, simultaneous coexistence of BT and WLAN signals is a major concern in many handheld consumer devices, since the two signals occupy the same frequency band of 2.4 to 2.5 GHz. Because of the limited bandwidth, spectrum sharing may be necessary to accommodate multiple users. Multiple users may also result in significant interference between operating devices. Moreover, in some instances, devices other than handheld consumer devices, such as devices using microwave signals or medical equipment, operate in this frequency spectrum and may produce significant interference or blocking signals that may affect BT and/or WLAN transmissions. As such, there is a need for a way to allow BT and WLAN coexistence, in particular allowing the respective signals to be received simultaneously.

SUMMARY OF THE EMBODIMENTS

Embodiments disclosed herein allow Wireless Local Area Network (WLAN)/Bluetooth (BT) coexistence using a radio frequency (RF) switch as a power splitter to split signals received from an antenna to both a WLAN receiver and a BT receiver. The WLAN/BT coexistence is achieved by concurrently enabling multiple branches of the RF switch, which allows the WLAN and BT signals to be received simultaneously. In another embodiment, a second switch may be placed on an output of a low noise amplifier (LNA). This configuration will operate as a power splitter between the WLAN receiver port and the BT port, and maximize the receiver sensitivity by amplifying both the WLAN and BT RF signals. One or both of the two switches may also function to bypass the LNA when the LNA is not needed and provide a low loss RF path, which serves to broaden the dynamic range of the device and avoid signal distortion during periods of increased signal power.

Those skilled in the art will appreciate the scope of the present invention and realize additional aspects thereof after reading the following detailed description of the invention in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Embodiments disclosed herein allow Wireless Local Area Network (WLAN)/Bluetooth (BT) coexistence using a radio frequency (RF) switch as a power splitter to split signals received from an antenna to both a WLAN receiver and a BT receiver. The WLAN/BT coexistence is achieved by concurrently enabling multiple branches of the RF switch, which allows the WLAN and BT signals to be received simultaneously. In another embodiment, a second switch may be placed on an output of a low noise amplifier (LNA). This configuration will operate as a power splitter between the WLAN receiver port and the BT port, and maximize the receiver sensitivity by amplifying both the WLAN and BT RF signals. One or both of the two switches may also function to bypass the LNA when the LNA is not needed and provide a low loss RF path, which serves to broaden the dynamic range of the device and avoid signal distortion during periods of increased signal power.

Implementation of a RF switch placed on an antenna port allows the RF switch to function as a power splitter (the signal power level is split into 2 halves) when desired. In one embodiment, the RF switch may function as a 3 dB power splitter. The RF switch may be a Single-Pole-Multi-Throw (SP2T, SP3T, etc.) RF switch in one embodiment.

Figure 1:
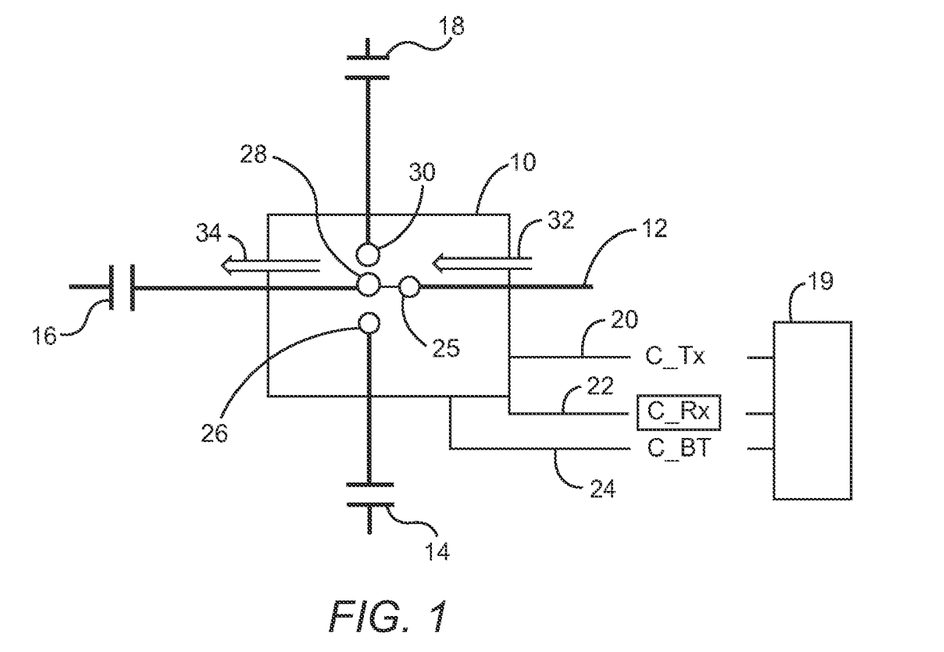
FIG. 1 illustrates an exemplary embodiment where a radio frequency (RF) switch is placed on an antenna port and the RF switch is controlled such that a RF signal passes through the antenna and a Wireless Local Area Network (WLAN) receive path.

FIG. 1 illustrates an exemplary embodiment where a RF switch 10 is placed on an antenna port of a communication device (not shown). The communication device may have an antenna port, such as antenna port 12 in FIG. 1, and a plurality of communication ports for receiving and transmitting signals. In the embodiment shown in FIG. 1, the plurality of communication ports include a WLAN transmit (Tx) port 14, a WLAN receive (Rx) port 16, and a BT port 18. The RF switch 10 is connected to the antenna port 12 and is capable of being selectively communicatively connected to the WLAN Tx port 14, the WLAN Rx port 16, and the BT port 18. The RF switch 10 is controlled such that a RF signal passes through the antenna port 12 and a WLAN Rx path.

In one embodiment, the RF switch 10 is a SP3T switch. The RF switch 10 may have three control inputs 20, 22, and 24, labeled C_Tx, C_Rx, and C_BT, respectively, in FIG. 1. The RF switch 10 of FIG. 1 also has a single pole 25 and three throws 26, 28, and 30. A controller 19 may be used to control the three control inputs 20, 22, and 24 in order to select to which of the three throws 26, 28, and 30 the pole 25 is connected. When the pole 25 is connected to the throw 26 (not shown), an output of the RF switch 10 corresponding to the throw 26 is connected to the WLAN Tx port 14, thereby allowing the WLAN Tx port 14 to be communicatively connected to the antenna port 12. When the pole 25 is connected to the throw 28, as shown in FIG. 1, an output of the RF switch 10 corresponding to the throw 28 is connected to the WLAN Rx port 16, thereby allowing the WLAN Rx port 16 to be communicatively connected to the antenna port 12. When the pole 25 is connected to the throw 30, an output of the RF switch 10 corresponding to the throw 30 is connected to the BT port 18, thereby allowing the BT port 18 to be communicatively connected to the antenna port 12. In this way, the control inputs 20, 22, and 24 may be used to select one or more of the outputs of the RF switch 10 such that the antenna port 12 is selectively communicatively connected to one or more of the communication ports (WLAN Tx port 14, WLAN Rx port 16, and BT port 18).

In FIG. 1, C_Rx control input 22 is enabled, which connects the pole 25 to the throw 28, thereby communicatively connecting antenna port 12 to The WLAN Rx port 16 such that the RF signal 32 may be received from the antenna port 12 as RF signal 34 at the WLAN Rx port 16. FIG. 1 represents a normal WLAN Rx mode.

Figure 2:
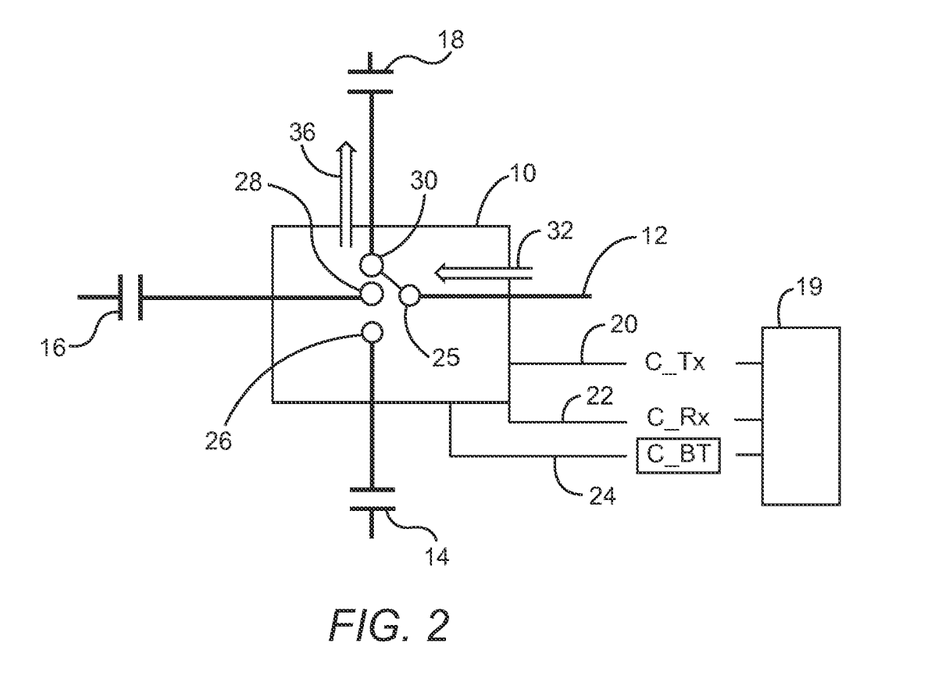
FIG. 2 illustrates an exemplary embodiment, where a RF switch is placed on an antenna port and the RF switch is controlled such that a RF signal passes through the antenna and a Bluetooth (BT) path.

FIG. 2 illustrates an exemplary embodiment, where a RF switch is placed on an antenna port and the RF switch is controlled such that a RF signal passes through the antenna and a BT path. In FIG. 2, C_BT control input 24 is enabled, which connects the pole 25 to the throw 30, thereby communicatively connecting the antenna port 12 to the BT port 18. This allows the RF signal 32 to pass through the antenna port 12 to the BT port 18 as RF signal 36. Thus, by enabling the C_BT control input 24, the BT path is enabled such that the RF signal 32 from the antenna port 12 is received at the BT port 18 of the communication device. Referring to both FIGS. 1 and 2, depending on which control input (C_Tx control input 20, C_Rx control input 22, or C_BT control input 24) is enabled, the RF signal 32 will pass through the antenna port 12 to either the WLAN Rx port 16 or the BT port 18. FIG. 2 represents a BT only mode.

Figure 3:
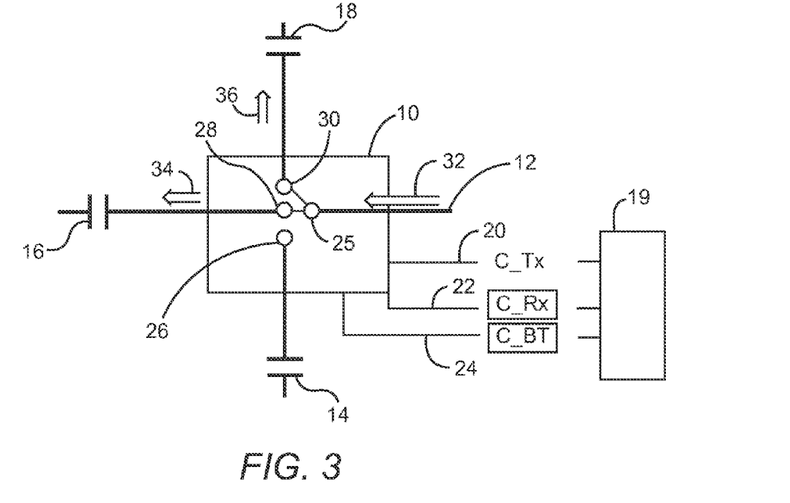
FIG. 3 illustrates an exemplary embodiment, where a RF switch is placed on an antenna port and the RF switch is controlled such that the RF signal passes through the antenna and is split between a WLAN receive path and a BT path.

FIG. 3 illustrates an exemplary embodiment, where a RF switch is placed on an antenna port and the RF switch is controlled such that the RF signal passes through the antenna and is split between a WLAN Rx path and a BT path. When the Rx and BT switch controls (i.e., C_Rx control input 22 and C_BT control input 24) are enabled simultaneously, as shown in FIG. 3, the pole 25 is connected to both the throw 28 and the throw 30, and the outputs of the RF switch 10 corresponding to the throws 28 and 30 are connected to the WLAN Rx port 16 and the BT port 18, respectively, thereby communicatively connecting both the WLAN Rx port 16 and the BT port 18 to the antenna port 12. Any RF signal 32 coming in through the antenna port 12 is split between the WLAN Rx port 16 as the RF signal 34 and the BT port 18 as the RF signal 36. In one embodiment, the incoming signal power is split equally (i.e., in half) between the two ports, WLAN Rx port 16 and BT port 18. In another embodiment, the incoming signal power may be split asymmetrically such that more power is split to either the WLAN Rx port 16 or the BT port 18. In some applications, the BT port 18 can handle more power loss better, so less power may be split to the BT port 18 in one embodiment.

FIG. 3 illustrates the simultaneous mode, where WLAN and BT signals may be received simultaneously. As used herein, "simultaneously" does not necessarily mean that the WLAN and BT signals are received instantaneously (i.e, at exactly the same time). Instead, "simultaneously" is used to refer to the fact that the WLAN Tx port 14, the WLAN Rx port 16, and the BT port 18 are all capable of receiving signals from the antenna port 12 at about the same time without requiring switching between a WLAN mode and a BT mode. In the simultaneous mode, the RF switch 10 is acting as a power splitter. In one embodiment, the RF switch 10 acts as a 3 dB power splitter. The resulting power split accomplished by the RF switch 10 sends the RF signal 32 to both ports (the WLAN Rx port 16 and the BT port 18) simultaneously, and the BT and WLAN systems can each then receive the signal and process it accordingly.

In another embodiment, another feature may be added in order to provide an improvement on the above mode shown in FIG. 3 for simultaneous signal reception. The embodiment of FIG. 3 allows both the WLAN receiver and the BT receiver to obtain the signal and process it accordingly. One caveat to this method of operation is that the signal power is split in half, so the incoming power level must be sufficient such that the receivers of each system can process it correctly. In order to increase the sensitivity and range of the receivers in this mode, a LNA and a second switch may be added to the receive circuitry of the communication device.

Figure 4:
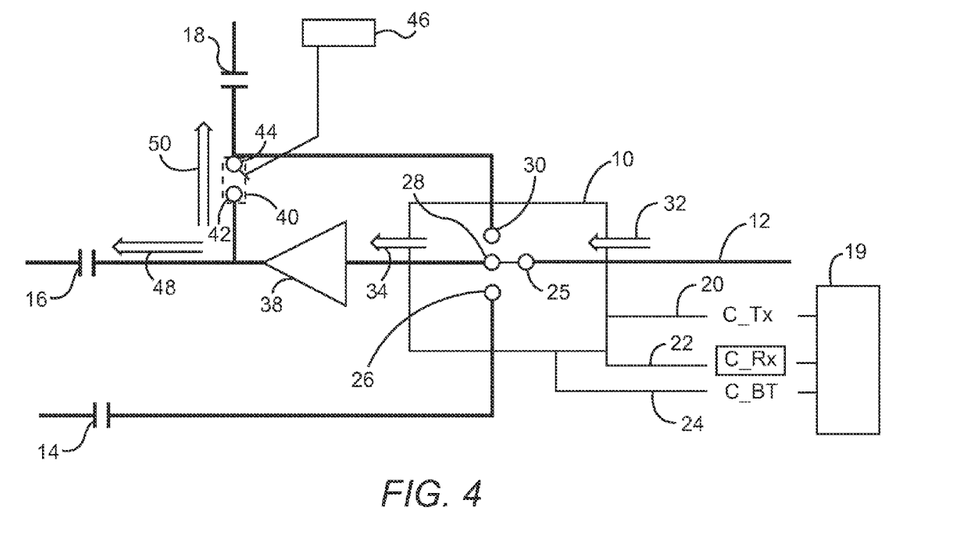
FIG. 4 illustrates an exemplary embodiment that includes a low noise amplifier (LNA) in the WLAN receive path and a second switch placed after the LNA on the WLAN receive path.

FIG. 4 illustrates an exemplary embodiment that includes a LNA in the WLAN Rx path and a second switch placed after the LNA on the WLAN Rx path. FIG. 4 includes the structure shown in FIG. 3 and adds a LNA 38 in the WLAN Rx path after the RF switch 10. The LNA 38 may provide signal amplification to both the WLAN Rx path and the BT path. An additional switch 40 may also be added and enabled after the LNA 38 on the WLAN Rx path, as shown in FIG. 4, such that the power is split after the LNA 38, providing signal amplification to both the WLAN Rx and BT paths. The switch 40 may be a Single-Pole-Single-Throw switch, as shown in FIG. 4, or it may be a Single-Pole-Multi-Throw, etc. (SP2T, SP3T, etc.) RF switch. In the embodiment shown in FIG. 4, the switch 40 has a pole 42 and a throw 44. A controller 19 controls a control input 46 to select whether the pole 42 is connected to the throw 44.

Thus, when in normal WLAN Rx mode, only the C_Rx control input 22 is enabled. Enabling the C_Rx control input 22 connects the pole 25 to the throw 28, thereby connecting the antenna port 12 to the WLAN Rx path and allowing the RF signal 32 to be received from the antenna port 12 as the RF signal 34 in the WLAN Rx path. Before reaching the WLAN Rx port 16, the RF signal 34 may be amplified by the LNA 38 such that amplified RF signal 48 is received at the WLAN Rx port 16.

If simultaneous WLAN/BT mode is desired, the Rx switch control (C_Rx control input 22) is enabled, connecting the pole 25 to the throw 28, thereby connecting the antenna port 12 to the WLAN Rx path. The RF signal 32 coming in through the antenna port 12 is sent to the WLAN Rx path as the RF signal 34. The RF signal 34 may be amplified by the LNA 38 to become the amplified RF signal 48. The amplified RF signal 48 is received at the WLAN Rx port 16. For the BT port 18 to also be able to receive an amplified signal, control input 46 is enabled, which connects the pole 42 to the throw 44, thereby connecting the WLAN Rx path to the BT path. Thus, the amplified RF signal 48 from the output of the LNA 38 passes through the switch 40 and is received at the BT port 18 as amplified RF signal 50.

This configuration shown in FIG. 4 allows each path, WLAN Rx and BT, to have approximately the gain of the LNA 38 minus 3 dB (per the switch 40 acting as a splitter) on each path, which serves to increase the receiver sensitivities of both the WLAN and the BT systems.

The switch 40 can be disabled (by not selecting the control input 46) when coexistent signal reception is not desired and the received signal will be routed solely to the WLAN Rx port 16 through the LNA 38 as the amplified RF signal 48.

Figure 5:
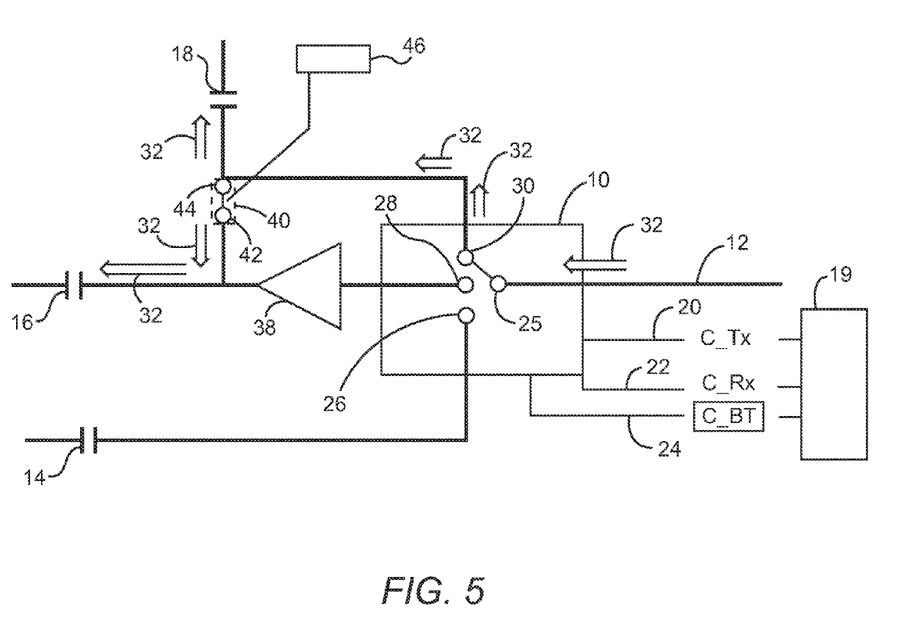
FIG. 5 illustrates an exemplary embodiment, similar to the embodiment of FIG. 4, where the LNA is bypassed to enable simultaneous receive mode for the WLAN and BT paths.

In addition, in embodiments where the LNA 38 is included, but where it is desired not to amplify the RF signal 32 from the antenna port 12 in the simultaneous mode, the LNA 38 may be bypassed. FIG. 5 illustrates an exemplary embodiment similar to the embodiment of FIG. 4 but where the LNA 38 is bypassed to enable simultaneous receive mode for the WLAN Rx and BT paths without amplifying the signal. In FIG. 5, the C_BT control input 24 is enabled, which connects the pole 25 to the throw 30, thereby connecting the antenna port 12 to the BT port 18. This allows the RF signal 32 to pass through the antenna port 12 to the BT port 18 (without going through the switch 40). Control input 46 is also enabled, connecting the pole 42 to the throw 44, thereby connecting the WLAN Rx path to the BT path. Thus, the RF signal 32 passes from the BT path through switch 40 into the WLAN Rx path and is received at the WLAN Rx port 16 without passing through the LNA 38 and without being amplified.

Figure 6:
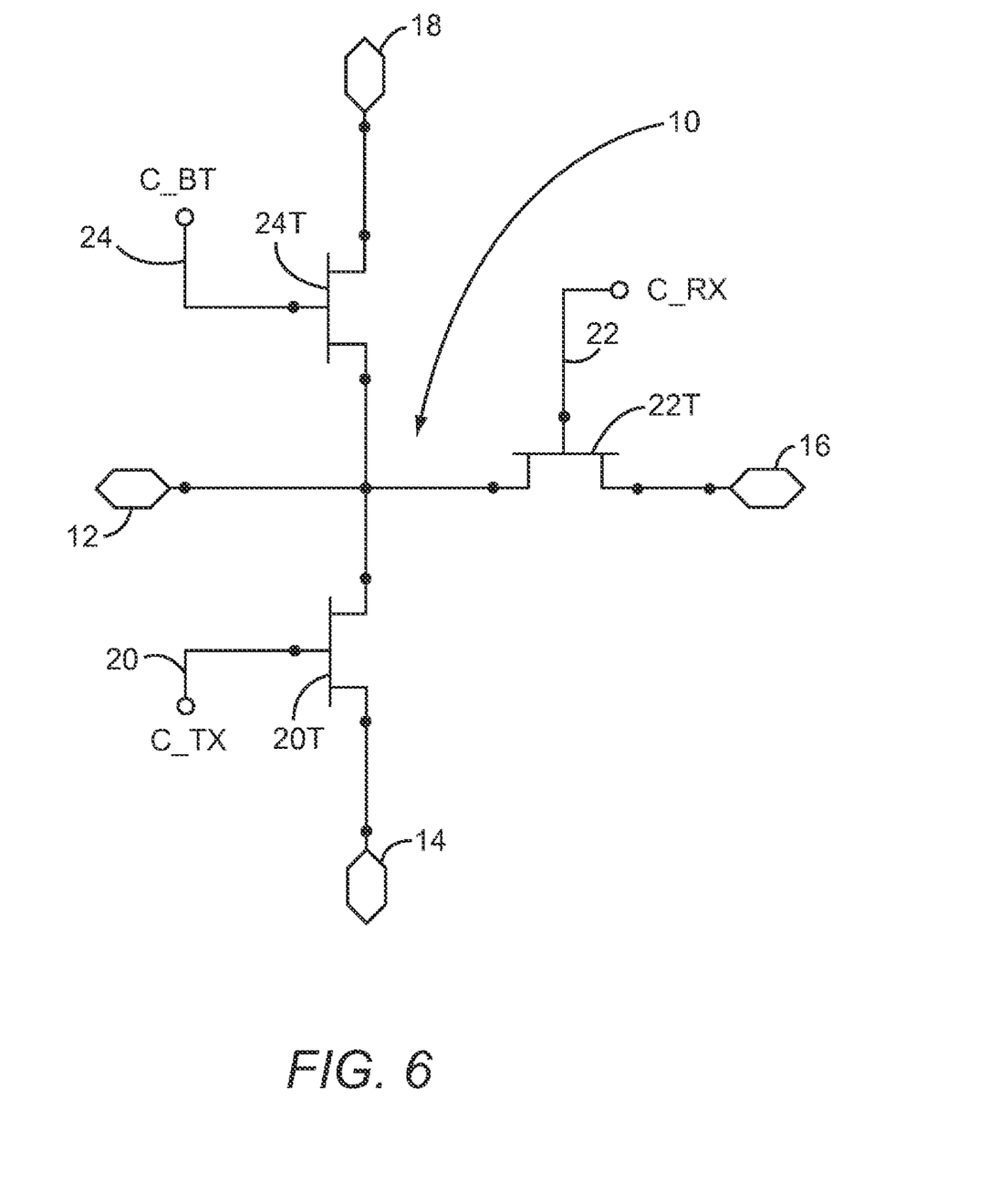
FIG. 6 illustrates an exemplary embodiment of a schematic diagram for the first RF switch illustrated in FIGS. 1-5.

FIG. 6 illustrates an exemplary embodiment of a schematic diagram for the RF switch 10 illustrated in FIGS. 1-5. In one embodiment, the RF switch 10 of FIGS. 1-5 is composed of Field Effect Transistors (FETs). The embodiment of RF switch 10 in FIG. 6 includes three transistors 20T, 22T, and 24T, where the transistors 20T, 22T, and 24T correspond to and are controlled by the C_Tx control input 20, C_Rx control input 22, and C_BT control input 24, respectively.

In the normal WLAN Rx mode, the C_Rx control input 22 is turned on and the transistor 22T controlled by the C_Rx control input 22 is enabled, allowing the received RF signal 34 to pass through to the WLAN Rx port 16 from the antenna port 12. In the normal WLAN Rx mode, the C_Tx control input 20 and the C_BT control input 24 are disabled, and thus the RF signal 32 is blocked by the transistors 20T and 24T as controlled by the C_Tx control input 20 and the C_BT control input 24. All RF signal power received by the antenna port 12 is routed through the transistor 22T controlled by the C_Rx control input 22 and is delivered to the WLAN Rx port 16. The RF signal flow for this mode is shown in FIG. 1.

In BT only mode, the C_BT control input 24 is turned on and the transistor 24T controlled by the C_BT control input 24 is enabled, allowing the received RF signal 36 to pass through to the BT port 18 from the antenna port 12. In BT only mode, the C_Tx control input 20 and the C_Rx control input 22 are disabled, and thus the RF signal 32 is blocked by the transistors 20T and 22T as controlled by the C_Tx control input 20 and the C_Rx control input 22. All RF signal power received by the antenna port 12 is routed through the transistor 24T controlled by the C_BT control input 24 and is delivered to the BT port 18. The RF signal flow for this mode is shown in FIG. 2.

When simultaneous WLAN/BT reception is desired, the C_Rx control input 22 and the C_BT control input 24 are enabled, turning on both transistors 22T and 24T. The C_Tx control input 20 is still disabled, so that the transistor 20T is still disabled, or open. The RF signal power is split between the WLAN Rx port 16 and the BT port 18, thus creating a power splitter (which may be 3 dB in one embodiment) for coexistent WLAN/BT reception. The RF signal flow for the simultaneous WLAN/BT mode is shown in FIG. 3.

Figure 7:
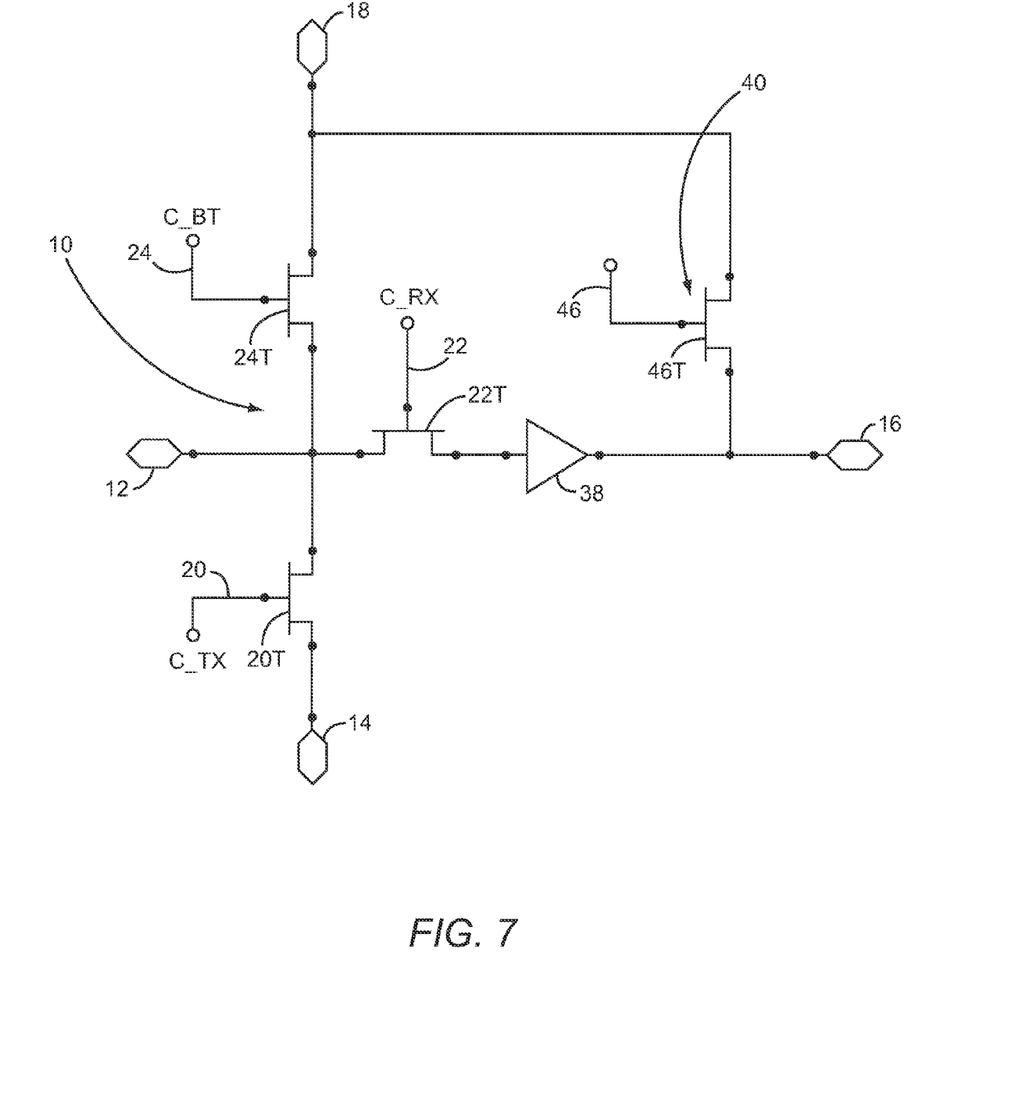
FIG. 7 illustrates an exemplary embodiment of a schematic diagram for the embodiment having two switches and a LNA as shown in FIGS. 4 and 5.

FIG. 7 illustrates an exemplary embodiment of a schematic diagram for the embodiment having two switches and a LNA as shown in FIGS. 4 and 5. In one embodiment, the RF switch 10 of FIGS. 1-5 is composed of FETs. The embodiment of RF switch 10 in FIG. 7 includes the three transistors 20T, 22T, and 24T, which correspond to and are controlled by the C_Tx control input 20, the C_Rx control input 22, and the C_BT control input 24, respectively. The switch 40 as shown in FIGS. 4 and 5 includes a transistor 46T, which corresponds to and is controlled by control input 46.

In one embodiment of FIG. 7, when it is desired to amplify the RF signal, the C_Rx control input 22 and the control input 46 are enabled and the transistors 22T and 46T controlled by the C_Rx control input 22 and the control input 46, respectively, are enabled, allowing the RF signal 32 from the antenna port 12 to pass through the transistors 22T and 46T to the C_Rx control input 22 and the control input 46. When the C_BT control input 24 and the C_TX control input 20 are disabled, then the transistors 20T and 24T controlled by the C_BT control input 24 and the C_TX control input 20 are also disabled, preventing any RF signal to flow through the transistors 20T and 24T. The RF signal 32 is received by the antenna port 12, and the RF signal 32 then flows through the transistor 22T controlled by the C_Rx control input 22, into the LNA 38. The signal is then amplified by the LNA 38 and subsequently split by the transistor 46T controlled by the control input 46. In one embodiment, half of the amplified signal power is delivered to the WLAN Rx port 16, and the other half is routed through the switch 40 and delivered to the BT port 18. In another embodiment, the incoming signal power may be split asymmetrically such that more power is split to either the WLAN Rx port 16 or to the BT port 18. In some applications, the BT port 18 can handle more power loss better, so less power may be split to the BT port 18 in one embodiment. This signal amplification allows smaller incoming signal power levels to be split and processed by each receiver concurrently. The RF signal flow for this method is shown in FIG. 4.

If coexistent signal reception is not desired for this configuration that includes the LNA 38, only the C_Rx control input 22 is enabled, and the switch 40 will be disabled. The received RF signal will be routed solely to the WLAN Rx port 16 through the LNA 38.

In addition, in embodiments where the LNA 38 is included, but where it is desired not to amplify the RF signal from the antenna port 12 in the simultaneous mode, the LNA 38 may be bypassed. The C_BT control input 24 is enabled, as is the control input 46. Enabling the transistor 24T allows the RF signal from the antenna port 12 to pass through the transistor 24T to the BT port 18. Since the C_Tx control input 20 and the C_RX control input 22 are disabled, then the transistors 20T and 22T controlled by the C_Tx control input 20 and the C_RX control input 22 are also disabled, preventing any RF signal from flowing through the transistors 20T and 22T. Since the control input 46 is enabled, then the transistor 46T is also enabled. This allows the RF signal passing through the transistor 24T to also pass through the transistor 46T of the switch 40 to the WLAN Rx port 16. Thus, the RF signal 32 from the antenna port 12 passes through the transistors 24T and 46T and is received by the WLAN Rx port 16 without passing through the LNA 38 and without being amplified.

Figure 8:
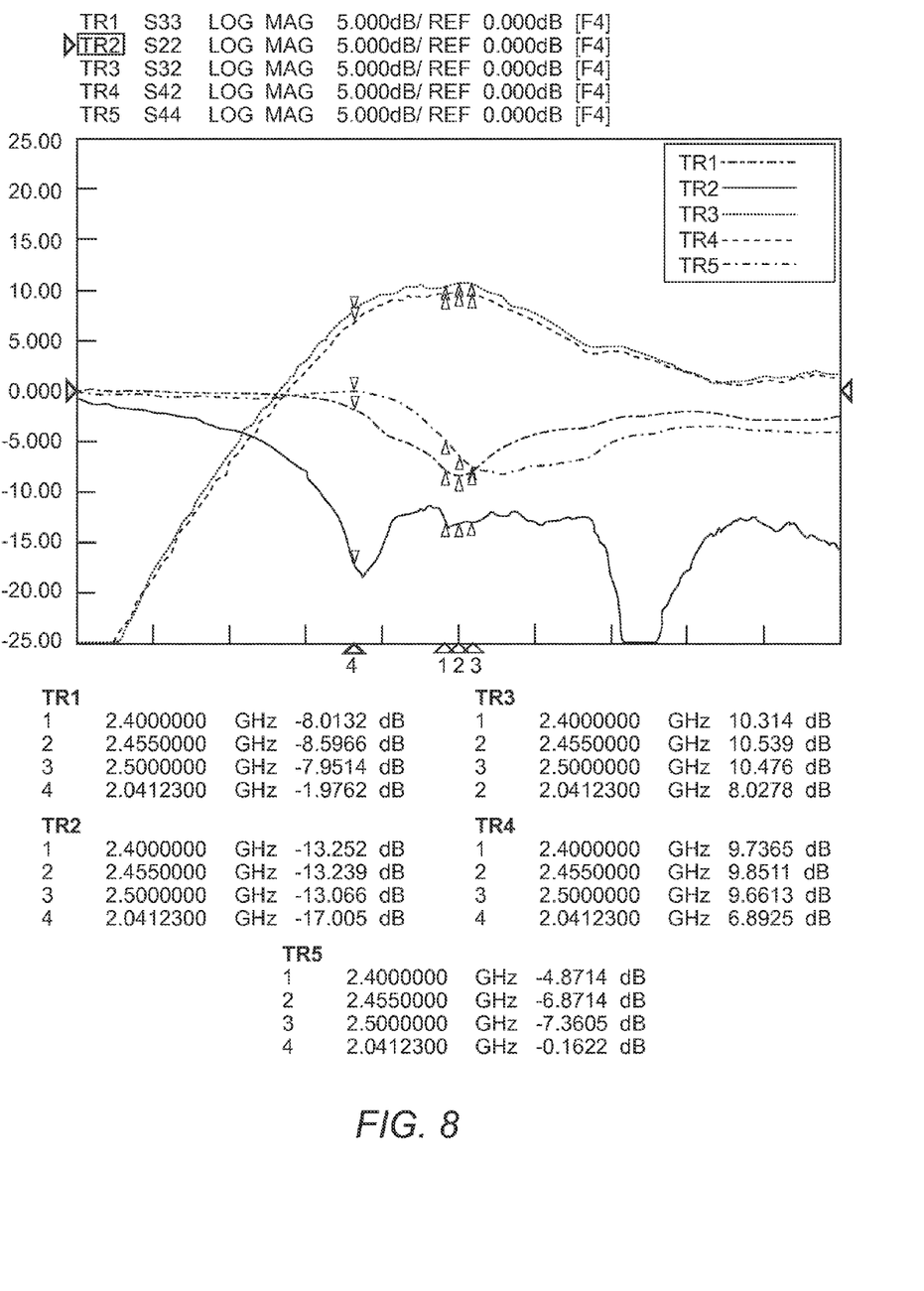
FIG. 8 is a graph that shows the measured gain of both the WLAN receive port and the BT port when using the exemplary embodiment of FIG. 4.

The architecture of FIG. 4 has shown improved power in situations where the receivers are located relatively far away from the power source and where power levels may be low. Initial measured data for this architecture is shown in FIG. 8. FIG. 8 is a graph that shows the measured gain of both the WLAN RX port 16 and the BT port 18 when using the exemplary embodiment of FIG. 4 that includes the LNA 38.

The graph in FIG. 8 shows the measured gain of both the WLAN Rx port 16 and the BT port 18 over several trials. The antenna port 12 is presented with a signal power level of −20 dBm. The RF signal flows through as shown in FIG. 4. The LNA 38 amplifies the signal and presents both the WLAN Rx port 16 and the BT port 18 with a signal power level of roughly −10 dBm. This 10 dB increase in power level increases the input power range over which the WLAN and BT systems can reliably operate. This allows a communication device to be further away from the source and still receive and properly interpret the data, including simultaneously received WLAN and BT signals.

Those skilled in the art will recognize improvements and modifications to the preferred embodiments of the present invention. All such improvements and modifications are considered within the scope of the concepts disclosed herein and the claims that follow.

What is claimed is:

1. An apparatus comprising:
   an antenna port;
   a plurality of communication ports for receiving or transmitting signals;
   a first switch comprising:
      at least one input connected to the antenna port;
      a plurality of outputs which are adapted to be selectively connected to at least one of the plurality of communication ports for receiving or transmitting the signals; and
      at least one control input; and
   a controller adapted to provide control information to the at least one control input to select one or more of the plurality of outputs such that the antenna port is selectively communicatively connected to the at least one of the plurality of communication ports for receiving or transmitting the signals, whereby one or more signals from the antenna port may be received at one or more of the plurality of communication ports,
   wherein the one or more signals from the antenna port comprise wireless local area network (WLAN) signals and Bluetooth (BT) signals, and
   wherein the WLAN signals are received at a first one of the plurality of communication ports and the BT signals are received at a second one of the plurality of communication ports at about the same time.

2. The apparatus of claim 1 wherein the control information provided to the at least one control input of the first switch is adapted to select two of the plurality of outputs such that the antenna port is selectively communicatively connected to two of the plurality of communication ports for receiving or transmitting the signals.

3. The apparatus of claim 1 wherein power of the one or more signals from the antenna port is split equally between the first one and the second one of the plurality of communication ports.

4. The apparatus of claim 1 wherein power of the one or more signals from the antenna port is split asymmetrically between the first one and the second one of the plurality of communication ports.

5. The apparatus of claim 1 further comprising at least one field effect transistor associated with the at least one control input, whereby the at least one field effect transistor is controlled by the control information provided to the at least one control input to select the one or more of the plurality of outputs.

6. The apparatus of claim 1 further comprising at least three field effect transistors associated with at least three control inputs, wherein the controller is further adapted to provide the control information to the at least three control inputs to select the one or more of the plurality of outputs.

7. The apparatus of claim 1 further comprising a low noise amplifier (LNA) adapted to amplify the WLAN signals before the WLAN signals are received at the first one of the plurality of communication ports and to amplify the BT signals before the BT signals are received at the second one of the plurality of communication ports.

8. The apparatus of claim 7 further comprising a second switch adapted to split the amplified signals generated by the LNA such that the amplified signals are received at two or more of the plurality of communication ports.

9. The apparatus of claim 8 wherein the first switch and the second switch operate to select whether one or more of the amplified signals are received at a first one of the plurality of communication ports, at a second one of the plurality of communication ports, or at both the first one and the second one of the plurality of communication ports.

10. The apparatus of claim 9 wherein the controller is further adapted to control the first switch and/or the second switch to select whether one or more of the amplified signals are received at the first one of the plurality of communication ports, at the second one of the plurality of communication ports, or at both the first one and the second one of the plurality of communication ports.

11. The apparatus of claim 9 wherein the first switch and the second switch are adapted to operate in conjunction to bypass the LNA.

12. A method of allowing a communication device to receive multiple types of wireless signals, the method comprising:
   providing a radio frequency (RF) switch having at least one input adapted to connect to an antenna port and a plurality of outputs which are adapted to be selectively connected to at least one of a plurality of communication ports;
   controlling the RF switch to select one or more of the plurality of outputs such that the antenna port is selectively communicatively connected to the at least one of the plurality of communication ports such that one or more signals from the antenna port may be received at one or more of the plurality of communication ports,
   wherein the one or more signals from the antenna port comprise wireless local area network (WLAN) signals and Bluetooth (BT) signals;

receiving the WLAN signals at a first one of the plurality of communication ports; and receiving the BT signals at a second one of the plurality of communication ports at about the same time as the receiving of the WLAN signals at the first one of the plurality of communication ports.

13. The method of claim 12 further comprising controlling the RF switch to select two of the plurality of outputs such that the antenna port is selectively communicatively connected to two of the plurality of communication ports.

14. The method of claim 12 further comprising splitting power of the one or more signals from the antenna port equally between the first one and the second one of the plurality of communication ports.

15. The method of claims 12 further comprising splitting power of the one or more signals from the antenna port asymmetrically between the first one and the second one of the plurality of communication ports.

16. The method of claim 12 wherein the RF switch comprises at least one field effect transistor and controlling the RF switch further comprises controlling the at least one field effect transistor to allow the one or more signals to be passed to the one or more of the plurality of outputs of the RF switch.

17. The method of claim 12 further comprising amplifying the WLAN signals before the WLAN signals are received at the first one of the plurality of communication ports and amplifying the BT signals before the BT signals are received at the second one of the plurality of communication ports.

18. The method of claim 17 further comprising using a second switch to split the amplified WLAN and BT signals such that the amplified WLAN signals are received at the first one of the plurality of communication ports and the amplified BT signals are received at the second one of the plurality of communication ports.

19. The method of claim 18 further comprising controlling the RF switch and/or the second switch to select whether one or more of the amplified WLAN and BT signals are received at the first one of the plurality of communication ports, at the second one of the plurality of communication ports, or at both the first one and the second one of the plurality of communication ports.

20. A radio frequency (RF) switch comprising:

at least one input adapted to connect to an antenna port of a communication device;

a plurality of outputs which are adapted to be selectively connected to at least one of a plurality of communication ports of the communication device;

at least one field effect transistor; and at least one control input associated with the at least one field effect transistor, wherein the at least one control input is adapted to receive control information from a controller to control the at least one field effect transistor to select two or more of the plurality of outputs such that the antenna port is selectively communicatively connected to the two or more of the plurality of communication ports, whereby one or more signals from the antenna port may be received at two or more of the plurality of communication ports of the communication device, and wherein the one or more signals from the antenna port comprise wireless local area network (WLAN) signals and Bluetooth (BT) signals, and wherein the WLAN signals are received at a first one of the plurality of communication ports and the BT signals are received at a second one of the plurality of communication ports at about the same time.

* * * * *